United States Patent
Levin et al.

(10) Patent No.: US 8,794,195 B2
(45) Date of Patent: Aug. 5, 2014

(54) HEAT STORAGE SYSTEM FOR AN ENGINE

(75) Inventors: Michael Levin, Ann Arbor, MI (US);
Furqan Zafar Shaikh, Troy, MI (US);
Danrich Henry Demitroff, Okemos, MI (US); Donald Masch, White Lake, MI (US); James Patrick O'Neill, Milford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/365,428

(22) Filed: Feb. 3, 2012

(65) Prior Publication Data

US 2013/0199750 A1 Aug. 8, 2013

(51) Int. Cl.
*F01P 7/14* (2006.01)
*F01P 11/02* (2006.01)
*F01P 3/20* (2006.01)

(52) U.S. Cl.
USPC .................... 123/41.1; 123/41.14; 123/41.51

(58) Field of Classification Search
USPC .................................. 123/41.1, 41.14, 41.51
See application file for complete search history.

(56) References Cited

U.S. PATENT DOCUMENTS

| | | | |
|---|---|---|---|
| 4,217,864 A * | 8/1980 | Theodore | 123/41.14 |
| 5,299,630 A * | 4/1994 | Schatz | 165/10 |
| 5,871,041 A | 2/1999 | Rafalovich et al. | |
| 6,059,016 A | 5/2000 | Rafalovich et al. | |
| 6,464,027 B1 | 10/2002 | Dage et al. | |
| 6,769,623 B2 * | 8/2004 | Ban et al. | 237/12.3 B |
| 2003/0074891 A1 * | 4/2003 | Tamura et al. | 60/284 |
| 2005/0229873 A1 * | 10/2005 | Willers | 123/41.14 |
| 2006/0070589 A1 * | 4/2006 | Uchimura et al. | 123/41.14 |
| 2007/0137592 A1 * | 6/2007 | Hanai | 123/41.14 |
| 2009/0241863 A1 | 10/2009 | Kimura et al. | |
| 2009/0250189 A1 | 10/2009 | Soukhojak et al. | |
| 2010/0037415 A1 | 2/2010 | Lansinger | |
| 2010/0043413 A1 * | 2/2010 | Orihashi et al. | 60/320 |
| 2010/0058999 A1 * | 3/2010 | Arnott | 123/41.1 |
| 2010/0186685 A1 * | 7/2010 | Hiyama | 123/41.08 |
| 2011/0048388 A1 | 3/2011 | Takahashi et al. | |
| 2011/0178665 A1 | 7/2011 | Yoshioka et al. | |

FOREIGN PATENT DOCUMENTS

DE 3990275 C1 8/1998
JP 11264683 A 9/1999

OTHER PUBLICATIONS

Levin, Michael et al., "Heat Storage Device for an Engine," U.S. Appl. No. 13/365,457, filed Feb. 3, 2012, 27 pages.

* cited by examiner

*Primary Examiner* — Lindsay Low
*Assistant Examiner* — Charles Brauch
(74) *Attorney, Agent, or Firm* — Julia Voutyras; Alleman Hall McCoy Russell & Tuttle LLP

(57) ABSTRACT

A method for recovering exhaust heat for an engine is disclosed herein. The method includes during an engine operation, reducing a volume of a circulating heat transfer fluid and discharging a heat storage device to heat an engine component. The method further includes distributing the circulating heat transfer fluid to one or more heat exchangers each in thermal contact with one or more engine systems.

20 Claims, 3 Drawing Sheets

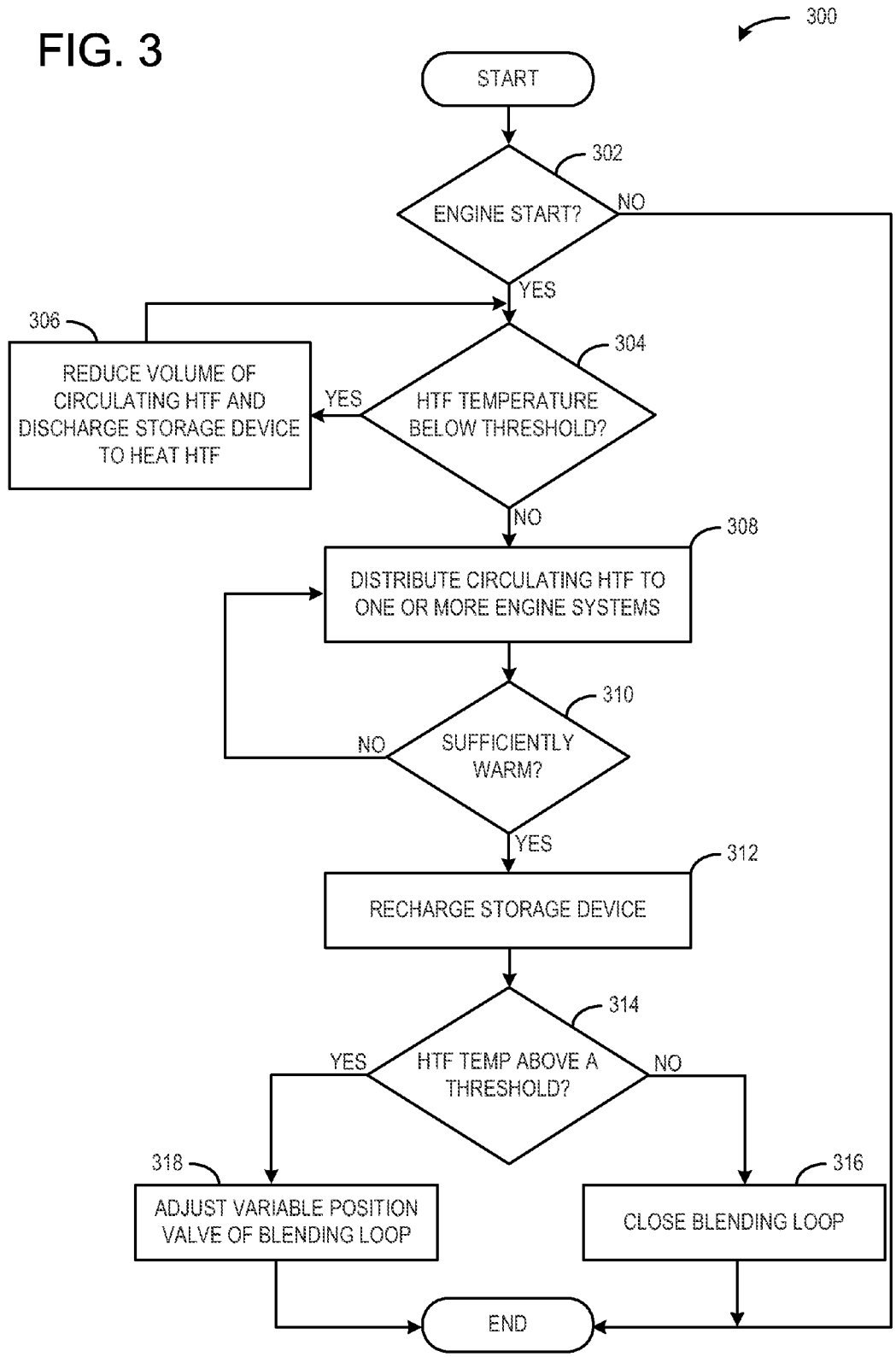

HEAT STORAGE SYSTEM FOR AN ENGINE

BACKGROUND AND SUMMARY

Vehicles may recover exhaust heat for transfer to various other systems in an internal combustion engine.

The inventors herein have recognized that rapid heat at engine start is not available in most systems because the systems require the exhaust system to warm up first, before wasted engine heat can be used to heat up various components. Further, transferring heat away from the exhaust system during a cold start operation delays the catalytic converter 'light-off.' As a result, the catalytic converter does not operate at an efficient temperature to burn trapped hydrocarbons, thereby increasing exhaust emissions.

As such, one example approach to address the above issues is claim 1.

According to one embodiment, a method for recovering exhaust heat includes reducing a volume of a circulating heat transfer fluid and discharging a heat storage device to heat an engine component. The method further includes, distributing the circulating heat transfer fluid to one or more engine systems. As such, heat may be discharged directly from a heat recovery system and provided to another engine system. Further, the heat storage device may be recharged by reducing the volume of the circulating heat transfer fluid. This configuration enables stored heat from a previous engine operation to be available at engine start to rapidly warm up various engine components.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 3 schematically shows an example method for operating the heat recovery system of FIG. 2.

DETAILED DESCRIPTION

The following description relates to a heat transfer system including phase changing materials, which are arranged in such a way that thermal energy from an exhaust system can be recovered. The example arrangements described herein allow thermal energy to be recovered and stored for later heating of a passenger compartment, for example. A heat transfer system may utilize a heat storage device to transfer heat even when the engine is not in operation. For example, the heat storage device may be in fluidic communication with an exhaust system component downstream from the catalytic converter, such as via heat exchanger. In this way, heat may transfer from the heat storage device even after the engine is no longer in operation. For example, the heat storage device may be insulated to store heat recovered from the exhaust system, which may be available for immediate use at engine start.

Additionally, the heat transfer system may include various heat transfer fluids to extract thermal energy from the exhaust system under a variety of different operating conditions. In this way, thermal energy may be recovered from the exhaust system to provide heat to various other systems such as a cabin heating system, lubrication systems, and/or other exhaust system components, if desired.

Further, the example systems allow for a simpler design as compared to traditional designs. For example, the heat storage device may provide heat to a cabin heating system at engine start, as introduced above. By coupling the heat storage device to a component of the exhaust system downstream from the catalytic converter, the cabin heating system may provide heat to the passenger cabin at engine start without relying upon a coolant system, and therefore, without waiting for the coolant system to warm up at engine start. Further, the system may provide the stored heat to the cabin heating system without delaying catalytic converter light-off, as described above.

Figure 1A:
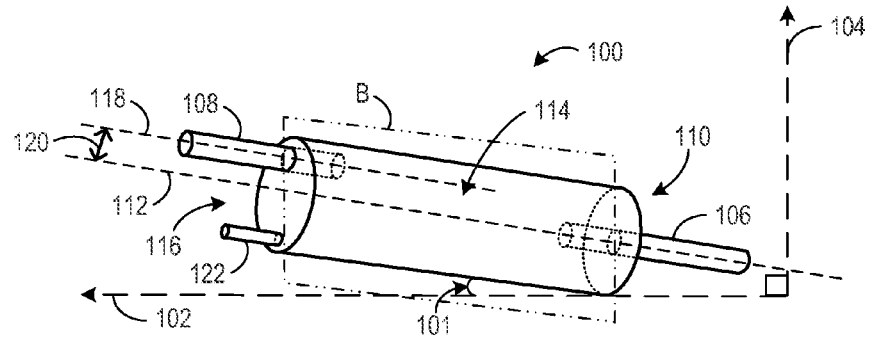
FIGS. 1A-1B schematically show an example heat storage device that may be included in an exhaust system.
Figure 1B:
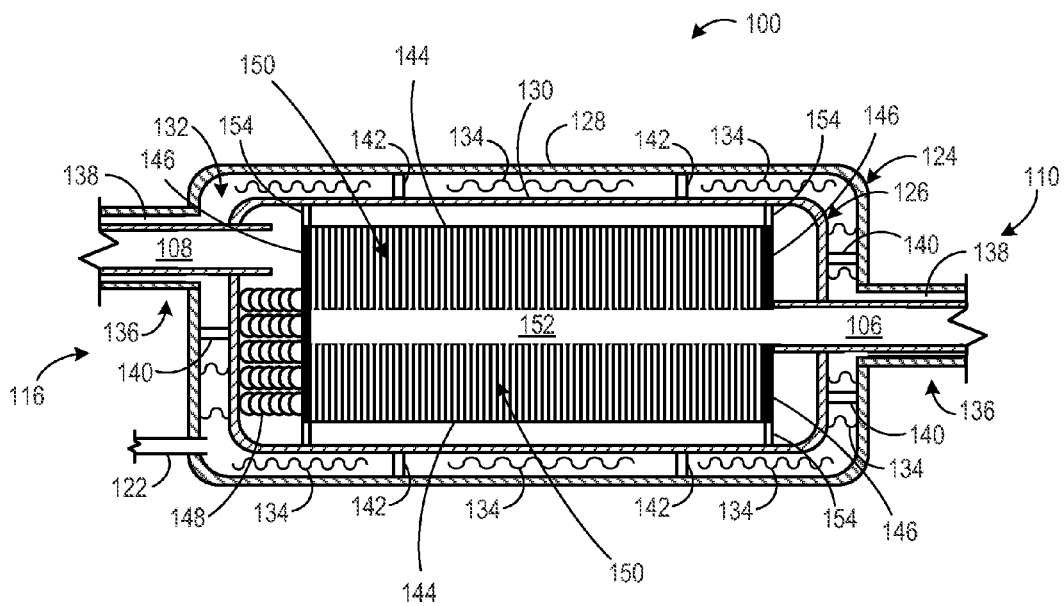

FIGS. 1A and 1B show a heat storage device 100 according to an embodiment of the present disclosure. FIG. 1A shows a perspective exterior view and FIG. 1B shows a perspective cross sectional view of heat storage device 100 taken along plane B. FIG. 1 shows an example bypass heat exchanger that may be coupled to heat storage device 100.

Referring first to FIG. 1A, heat storage device 100 may be a cylindrical shape. In other words, heat storage device 100 may have a circular cross section. Further, heat storage device 100 may be tilted by an angle 101 from a horizontal. Such an angle may facilitate efficient heat transfer through the device. As used herein, the horizontal refers to the ground over which the vehicle travels. For example, FIG. 1A shows a horizontal axis 102 and a vertical axis 104. The vertical axis may be orthogonal to the horizontal axis. Therefore, the vertical axis may be orthogonal to the ground over which the vehicle travels. As shown, heat storage device 100 may be tilted angle 101 from horizontal axis 102. In some embodiments, heat storage device 100 may be tilted 5° from the horizontal; however, it will be appreciated that other angles are possible without departing from the scope of this disclosure. Further, in some embodiments, heat storage device 100 may not be tilted. For example, heat storage device 100 may be level with the horizontal. In other words, angle 101 may be zero degrees.

As shown, heat storage device 100 includes an inlet passage 106 and an outlet passage 108. The inlet and outlet passages may carry a heat transfer fluid. Further, the heat storage device may house a phase changing material (PCM).

Inlet passage 106 may be coupled to heat storage device 100 at a central position. For example, inlet passage 106 may be coupled to a first end 110 of heat storage device 100 at the central position. In other words, inlet passage 106 may have a central axis 112 that is shared with a central axis of end 110, and further, shared with a central axis of heat storage device 100. Inlet passage 106 may be configured to supply heat storage device 100 with heat recovered from the exhaust system, for example. In some embodiments, the heat transfer fluid of inlet passage 106 may be coupled to a pump (not shown) to drive a movement of the heat transfer fluid. Further, a bypassable heat exchanger may be positioned upstream from inlet passage 106. Such a heat exchanger is discussed further with reference to FIG. 1C. Further, inlet passage 106 may include a portion that extends into an interior 114 of heat storage device 100.

Outlet passage 108 may be coupled to heat storage device 100 at a top position. For example, outlet passage 108 may be coupled to a second end 116 of heat storage device 100 at the top position. In other words, outlet passage 108 may have a central axis 118 that is a distance 120 from shared central axis 112 in a vertical direction (e.g., along vertical axis 104). In this way, outlet passage 108 is positioned towards a periphery of end 116, rather than centrally located, to advantageously reduce bubble accumulation in the heat transfer fluid. However, in some embodiments, outlet passage 108 may be centrally located at end 116, if desired. Outlet passage 108 may be configured to transfer heat from heat storage device 100 to another system of the vehicle. For example, outlet passage 108 may transfer stored heat to the cabin heating system, the coolant system, the lubrication system, and/or another system of the vehicle. Further, outlet passage 108 may include a portion that extends into the interior 114 of heat storage device 100.

As shown, heat storage device 100 includes a vacuum passage 122. For example, vacuum passage 122 may be coupled to heat storage device 100 at end 116. Vacuum passage 122 may be coupled to both heat storage device 100 and a vacuum pump (not shown). For example, in some embodiments, heat storage device 100 may include a vacuum jacket, and vacuum passage 122 may be a conduit for evacuating an airspace within the vacuum jacket. In this way, a pressure within at least a portion of interior 114 may be reduced. In some embodiments, the pressure within interior 114 may be reduced to 1 microbar or less.

FIG. 1B shows a perspective interior view of heat storage device 100. As shown, heat storage device 100 may be double walled. In other words, heat storage device 100 may include an outer vessel 124 and an inner vessel 126. For example, heat storage device may include outer walls 128 and inner walls 130. Further, heat storage device may include vacuum jacket 132 positioned between outer walls 128 and inner walls 130. As described above, vacuum passage 122, along with a vacuum pump, may suction air out of vacuum jacket 132 such that a pressure within vacuum jacket 132 is reduced.

Vacuum jacket 132 may hold a reduced pressure around an exterior of inner vessel 126 when a vacuum is applied. By applying a vacuum, water vapor and other gaseous compounds can be evacuated from the surfaces of the insulating layers as hot fluid is pumped through the heat transfer fluid passages. Further, vacuum jacket 132 may include one or more anti-radiation foils 134 that reduce heat loss to the surrounding environment via radiation.

It will be appreciated that the perspective view of FIG. 1B shows a longitudinal cross section of the heat storage device 100, thus it will be appreciated that outer walls 128, inner walls 130, and vacuum jacket 132 extend circumferentially around a perimeter of heat storage device 100 and longitudinally, for example, along axis 112.

Further, at least a portion of inlet passage 106 and outlet passage 108 may be double walled and include a vacuum space. For example, portions 136 exterior to heat storage device 100 may be double walled similar to the inner and outer vessels. Further, vacuum spaces 138 of the inlet and outlet passages may coalesce with vacuum jacket 132 of the heat storage device.

Heat storage device 100 may include one or more axial supports 140. Axial supports 140 may couple inner vessel 126 to outer vessel 124 such that the inner vessels is suspended and supported within the outer vessel. As shown, axial supports 140 may be coupled to outer walls 128 and inner walls 130, and thus, may be positioned within vacuum jacket 132. The axial supports may be composed of a material with low heat conducting properties. For example, axial supports 140 may be composed of titanium or a composite including titanium or another material with low heat conducting properties. Further, in some embodiments the axial supports may be perforated to further reduce heat loss to the surrounding environment.

Further, the inner vessel may be additionally and/or alternatively supported by radial supports 142. Such radial supports may be located circumferentially at various positions. As shown, radial supports 142 may be coupled to outer walls 128 and inner walls 130, and thus, may be positioned within vacuum jacket 132. Similar to the axial supports, the radial supports 142 may be composed of titanium or a composite including titanium or another material with low heat conducting properties. Further, in some embodiments the radial supports may be perforated to further reduce heat loss to the surrounding environment.

As shown, heat storage device 100 includes two axial supports at end 110, one axial support at end 116, and four radial supports 142. It will be appreciated that the number of axial and radial supports shown is non-limiting and another number of supports and/or another configuration of supports is possible without departing from the scope of this disclosure. The supports are provided to illustrate a general concept of a configuration enabling heat storage device 100 to withstand gravitational acceleration forces that may occur when the heat storage device 100 is rigidly coupled to the vehicle body.

Heat storage device 100 may further include a phase changing material (PCM) stack 144 supported between retention plates 146 via one or more springs 148. PCM stack 144 may include a plurality of PCM elements 150 arranged radially about a central feed passage 152. In some embodiments, the configuration of the PCM stack is such that the PCM stack retains 80% of stored heat for at least 16 hours, which may be used as a heat source at engine start to heat the passenger cabin, as described above. Further, heat stored in PCM stack 144 may be discharged to heat the passenger cabin or another engine system without starting the engine. For example, PCM stack discharge may be initiated remotely and does not necessarily have to coincide with engine-start. However, PCM stack discharge may be initiated remotely along with engine-start, for example, using a remote starter to start engine 12.

The plurality of PCM elements 150 include a phase changing material capable of storing a large quantity of heat in a form of a latent heat of fusion. Since the plurality of PCM elements 150 are surrounded by the double wall configuration, heat storing capabilities are enhanced. In other words, the double wall configuration acts like a thermos to retain heat stored within the plurality of PCM elements 150. In some embodiments, each PCM element may include the same phase changing material, and thus, the PCM stack may have one phase transfer temperature. In other embodiments, the PCM stack may include PCM elements with different phase changing materials, wherein each different phase changing material has a different phase transfer temperature. In such an example, a time to charge the PCM stack may be reduced. In other words, the time for the PCM stack to reach a maximum heat storing potential may be reduced.

As shown, heat transfer fluid may be delivered to PCM stack 144 via centrally located inlet passage 106, and further, via center feed passage 152. Thus, it will be appreciated that inlet passage 106 is in fluidic communication with center feed passage 152. Thus, heat transfer fluid flows radially from center feed passage 152 to the plurality of PCM elements 150. Heat transfer fluid exits the heat storage device via outlet passage 108 arranged in the top position, as described above.

As the heat transfer fluid flows through the PCM stack, a pressure drop occurs. To reduce the pressure drop, the inlet passage 106 and the outlet passage 108 are straight. In other words, the inlet passage 106 and the outlet passage 108 do not include bends. Further, the inlet passage 106 and the outlet passage 108 do not include corrugations. Due to the absence of corrugations, a rate of heat loss may potentially increase. However, since the inlet and outlet passages include a vacuum space around a circumference of these passages, such a potential for heat loss is reduced.

As shown, retention plates 146 may be positioned at either end of PCM stack 144. For example, one retention plate 146 may be positioned proximate to end 110, and another retention plate 146 may be positioned proximate to end 116. Retention plates 146 may be a circular shape and may have a diameter that is approximately equal to a diameter of PCM stack 144. As another example, retention plates 146 may have a larger diameter or a smaller diameter than PCM stack 144. The retention plates may be coupled to the inner vessel via one or more plate extensions with windows 154 to allow HTF to reach exit 108. Six axial rods (not shown) allow retention of the PCM stack in the radial and circumferential directions. The rods are welded to the retention plates. As such, the PCM stack is retained inside inner vessel 126 to reduce the potential for stack element sliding and/or rotation during vehicle operation.

Further, one or more springs 148 may further maintain the position of the PCM stack. As shown, one or more springs 148 may be positioned proximate to end 116 between retention plate 146 and inner walls 130. Springs 148 may be configured to ensure proper contact between the PCM elements during thermal expansion and thermal compression that results from the heat transfer fluid heating and cooling. In some embodiments, springs 148 may have a combined force of 100 Newtons or higher to maintain proper contact between the PCM elements. As shown in FIG. 1B, heat storage device 100 may include five springs; however the heat storage device may include more than five springs or less than five springs, if desired.

Figure 1C:
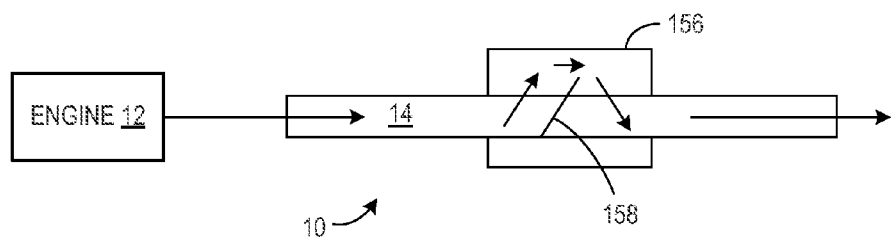
FIG. 1C schematically shows an example heat exchanger that may be coupled to the heat storage device of FIGS. 1A-1B.

FIG. 1C schematically shows a heat exchanger 156 thermally coupled to exhaust passage 14. In some embodiments, heat exchanger 156 may be thermally coupled to exhaust passage 14 at a position between engine 12 and one or more exhaust emission control devices 16. For example, heat exchanger 156 may be thermally coupled to exhaust passage 14 upstream from an oxidation catalyst such as a diesel oxidation catalyst (DOC). Heat exchanger 156 may be fluidically coupled to heat storage device 100 via inlet passage 106. For example, heat exchanger 156 may be thermally coupled to inlet passage 106 at a position upstream from heat storage device 100. In some embodiments, heat exchanger 156 may be an evaporative region to extract heat from heat passage 14 and provide said heat to heat storage device 100 by way of inlet passage 106. For example, heat exchanger 156 may include heat transfer tubing that carries heat transfer fluid supplied by an engine-driven pump to flow inside the tubing. As another example, the heat transfer tubing may carry heat transfer fluid supplied by an electrically-driven pump to flow inside the tubing. Such a configuration of heat transfer tubing may be fluidically coupled to inlet passage 106. As one example, the heat transfer fluid of the tubing may be the same heat transfer fluid of inlet passage 106. As another example, the heat transfer fluid of the tubing may be a different fluid than the heat transfer fluid of inlet passage 106.

In some embodiments, heat exchanger 156 is a liquid-to-liquid heat exchanger. In other embodiments, the heat exchanger 156 could be a gas-to-liquid or gas-to-thermosyphon heat exchanger.

Further, exhaust passage 14 may include a bypass valve 158 that directs exhaust gas flow through heat exchanger 156. Bypass valve 158 is shown in a bypass position (e.g., a closed position) in FIG. 1C. Bypass valve 158 may be actuated via a controller, or bypass valve 158 may be a passive valve, if desired. Bypass valve 158 may be in an open position (e.g., exhaust gases are not diverted to heat exchanger 156) when exhaust back pressure reaches a threshold value. For example, bypass valve 158 may be closed at high exhaust flows and/or high exhaust temperatures. As such, bypass valve 158 may reduce loss of engine output, and therefore, may reduce fuel consumption.

It will be appreciated that the disclosed system may include more than one heat exchanger. For example, a heat exchanger may be positioned upstream from inlet passage 106, and one or more heat exchangers may be positioned downstream from outlet passage 108. For example, a heat exchanger may be positioned at an interface between the heat recovery system and another system of the vehicle. Such a configuration is described in further detail with respect to FIG. 2.

It will be appreciated that FIGS. 1A-1C are shown in simplified form and that numerous variations are possible without departing from the scope of this disclosure. Further, heat storage device 100 may include additional and/or alternative components than those illustrated in FIGS. 1A and 1B. Further still, it is to be understood that heat storage device 100 is provided to illustrate a general concept, and thus, numerous geometric configurations are possible without departing from the scope of this disclosure.

Figure 2:
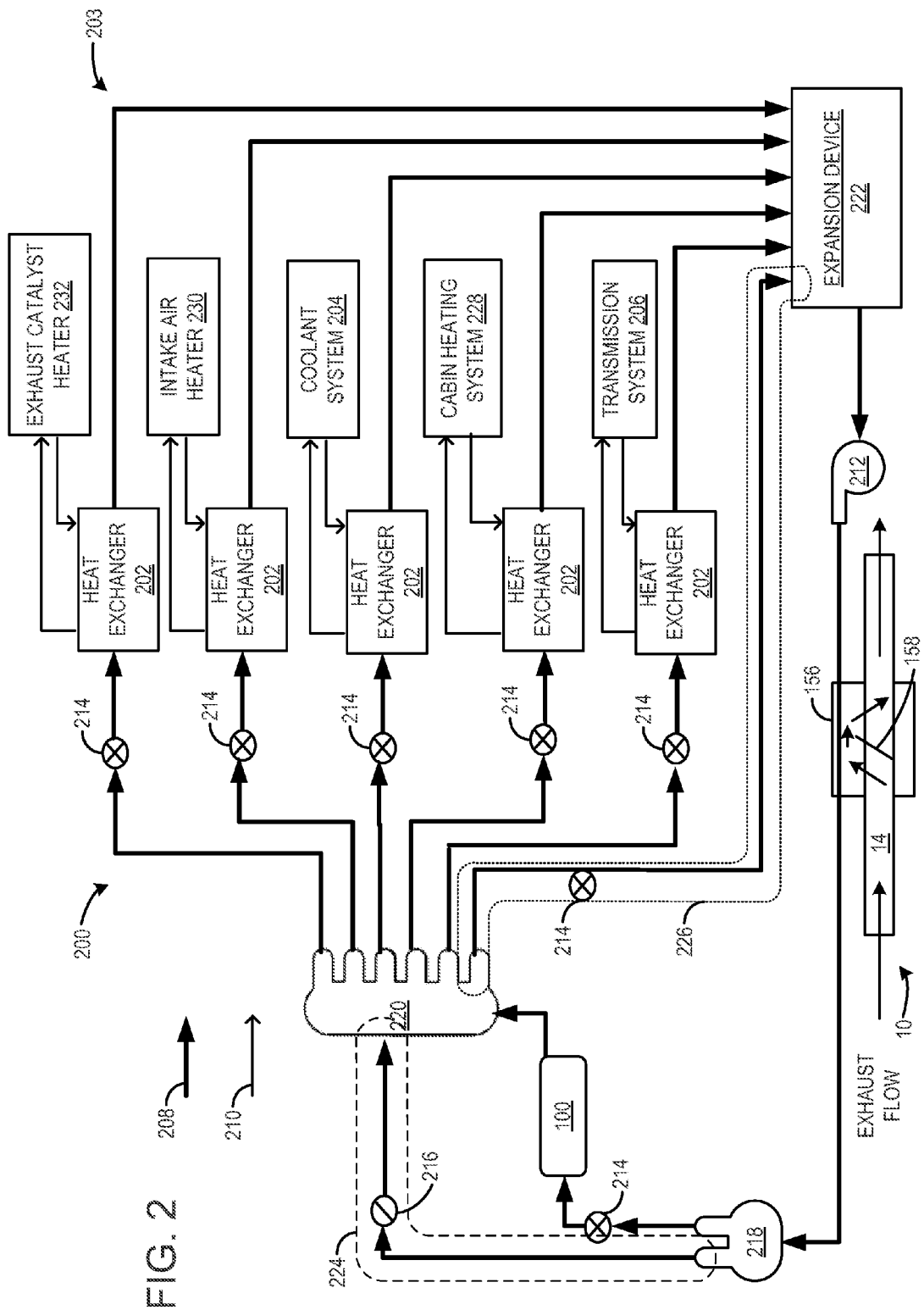
FIG. 2 schematically shows an example heat recovery system including the heat storage device of FIGS. 1A-1B.

FIG. 2 schematically shows a heat recovery system 200 including heat storage device 100 and a plurality of heat exchangers. FIG. 2 includes similar features as FIG. 1, and like features are indicated with common reference numbers. Such features will not be discussed repetitively for the sake of brevity.

As shown, heat recovery system 200 includes heat exchanger 156 to recover heat from exhaust system 10, as described above. Heat recovery system 200 may further include one or more additional heat exchangers 202. Heat exchangers 202 may transfer heat between heat recovery system 200 and another engine system 203. For example, heat exchangers 202 may transfer heat to coolant system 204, cabin heating system 228, and/or transmission system 206. In other words, heat exchangers 202 may be thermally coupled (e.g., in thermal contact) with a fluid of the coolant system 204, the cabin heating system 228 and/or the transmission system 206 to transfer heat to each respective system.

It will be appreciated that each of the engine systems 203 are separate systems from heat recovery system 200 and exhaust system 10. As such, engine systems 203 include components that are separate from the components of heat recovery system 200 and exhaust system 10. Thus, engine systems 203 do not include heat exchanger 156, heat exchangers 202, heat storage device 100, or another component of heat recovery system 200 and exhaust system 10. For example, cabin heating system 228 may include a heater core and a fan, wherein the heater core and the fan are separate from the heat recovery system and the exhaust system. Thus it is to be understood that only a fluid conduit (e.g., a coolant passage) of each engine system 203 is in thermal contact with the heat recovery system 200 at a position coinciding with the heat exchanger 202, for example. In this way, heat transfer occurs at the heat exchanger.

It will be appreciated that one or more of the heat exchangers may be gas-to-liquid and/or gas-to-thermosyphon heat exchangers. As shown, heat exchangers 202 may be thermally coupled to an engine system in parallel. In some embodiments, heat exchangers 202 may be thermally coupled to each of the engine systems in series. For example, heat transfer fluid may flow through a series of heat exchangers 202 fluidically coupled to a common heat transfer fluid passage.

As shown, heat transfer fluid (HTF) may flow through a heat exchanger and may thermally transfer heat to a fluid of one or more of the aforementioned systems. Arrows 208 generally indicate a direction of HTF flow, and arrows 210 generally indicate a direction of fluid flow for each engine system. Pump 212 may drive HTF fluid flow through heat recovery system 200. As shown, pump 212 is positioned upstream from heat exchanger 156; however, another position is possible without departing from the scope of this disclosure. Further, it will be appreciated that coolant system 204, cabin heating system 228 and/or the transmission system 206 may have another driving mechanism to drive fluid flow through each respective system. For example, each engine system 203 may have a pump, similar to pump 212, fluidically coupled to the fluid flow.

Heat recovery system 200 may further include one or more control valves 214, one or more variable position valves 216, one or more manifolds such as manifold 218 and manifold 220, and expansion device 222.

Control valves 214 may be actuated by a controller (not shown) to regulate HTF flow through heat recovery system 200. As shown, a control valve may be positioned upstream from one of the heat exchangers 202, upstream from heat storage device 100, and/or at another position within heat recovery system 200 to regulate HTF flow. Depending on an operational state of the vehicle, one or more of the control valves may be actuated to regulate a temperature of the HTF. For example, when one or more control valves are closed, a volume of circulating HTF can be reduced such that the HTF can increase in temperature more rapidly.

Further, the HTF temperature may be regulated via actuation of variable control valve 216. Such a control valve may be actuated to open at varying degrees to change a fluid flux of the HTF passing through variable control valve 216. As shown, variable control valve 216 is positioned upstream from manifold 220, and is included within bypass loop 224. Bypass loop 224 may bypass heat storage device 100. Therefore, bypass loop 224 may allow HTF to circulate without passing through heat storage device 100. For example, to conserve heat stored in heat storage device 100, variable control valve 216 may be adjusted to allow HTF fluid flow to flow through bypass loop 224. In other words, bypass loop 224 may be a blending loop that blends cooler HTF fluid with warmer HTF fluid that circulates through heat exchanger 156, heat storage device 100, and/or one or more heat exchangers 202. By blending HTF circulating through bypass loop 224 with other circulating HTF flow, an overall temperature of the circulating HTF may be reduced.

Further still, the HTF temperature may be regulated by routing all circulating HTF flow through bypass loop 226. For example, bypass loop 226 may be an exhaust temperature boosting loop and bypass loop 226 may be a thermal recharging loop, depending on the operational state of engine 12 and/or the thermal capacity of heat storage device 100. For example, bypass loop 226 may function as the exhaust temperature boosting loop when heat storage device 100 holds a thermal charge and the exhaust temperature is below a threshold value. Further, heat exchanger 156 may be positioned upstream from one or more exhaust emissions control devices and heat storage device 100 may discharge heated HTF to be delivered to heat exchanger 156. In this way, heated HTF may only be circulated through bypass loop 226 to increase a temperature of the exhaust flow, such that a time to reach catalyst light-off is reduced.

Further, as the thermal recharging loop, bypass loop 226 may extract heat from the exhaust flow to recharge heat storage device 100. Thus, HTF may only flow through thermal charging loop 225 to increase the temperature of HTF via heat exchanger 156. In this way, HTF may be heated by the exhaust flow to recharge the thermal capacity of heat storage device 100. It may be advantageous to recharge heat storage device 100 in this way when a temperature of the heat storage device is below a threshold value. For example, after heat storage device has discharge its thermal capacity, and/or after the various engine systems are sufficiently warm.

In other words, one or more control valves 214 positioned upstream from heat exchangers 202 may be closed to reduce a volume of circulating HTF, and/or variable position control valve 216 may also be closed, such that circulating HTF only passes through bypass loop 226, heat exchanger 156, and heat storage device 100. A method for regulating HTF flow through heat recovery system 200 by actuating one or more control valves is described with respect to FIG. 3.

As shown, manifolds 218 and 220 may be positioned in heat recovery system 200 where more than one pipe carrying HTF fluid merges. For example, manifold 218 may be configured to receive HTF fluid from one pipe and may include two HTF outlets. As another example, manifold 220 may be configured to receive HTF fluid from more than one pipe and may include more than one outlet. As shown, manifold 220 receives HTF flow from heat storage device 100 and from bypass loop 224. Further, manifold 220 may have an outlet directed towards each heat exchanger 202 and/or to thermal charging loop 225. It will be appreciated that manifolds 218 and 220 are provided as non-limiting examples, and thus, other configurations are possible without departing from the scope of this disclosure.

Expansion device 222 may be positioned downstream from the plurality of heat exchangers 202. As shown, expansion device 222 is configured to receive HTF from each of the heat exchangers 202, as well as thermal recharging loop 225. For example, expansion device 222 may be provided for degassing. In other words, expansion device 222 may be positioned downstream from heat exchangers 202 and thermal recharging loop 225 to regulate a pressure of the incoming HTF flow.

It will be appreciated that heat recovery system 200 is provided by way of example, and thus, is not meant to be limiting. Therefore, it is to be understood that heat recovery system 200 may include additional and/or alternative features than those illustrated in FIG. 2 without departing from the scope of this disclosure. For example, the heat recovery system may include a three-way valve to regulate HTF flow to more than one engine system.

FIG. 3 schematically shows an example method 300 that may be used to operate heat recovery system 200.

At 302, method 300 includes determining if an engine has started. If the answer to 302 is NO, method 300 ends. If the answer to 302 is YES, method 300 continues to 304.

At 304, method 300 includes determining if an HTF temperature is below a threshold value. For example, the exhaust temperature may be an exhaust gas temperature upstream and/or downstream from an emissions control device. If the answer to 304 is YES, method 300 continues to 306. If the answer to 304 is NO, method 300 continues to 308.

At 306, method 300 includes reducing a volume of circulating heat transfer fluid (HTF) and discharging a heat storage device (e.g., heat storage device 100) to heat an exhaust system component, such as an exhaust system component. For example, reducing the volume may include closing one or more control valves to inhibit the circulating heat transfer fluid from being distributed to one or more engine systems. Further, discharging the heat storage device may include discharging stored thermal energy of the heat storage device, wherein the stored thermal energy is stored from a previous engine operation. Further still, the stored thermal energy may be transferred to the circulating heat transfer fluid and distributed to the exhaust system component. In some embodiments, the exhaust system component may be upstream from an emissions control device.

At 308, method 300 includes distributing circulating HTF to one or more engine systems. For example, one or more control valves may be actuated to distribute circulating HTF to one or more of a cabin heating system, an engine coolant system, a transmission system, etc.

At 310, method 300 includes determining if the one or more engine systems are sufficiently warm. If the answer to 310 is NO, method 300 returns to 306. If the answer to 310 is YES, method 300 continues to 312.

At 312, method 300 includes recharging the heat storage device. For example, the volume of circulating HTF may be reduced and/or a bypass loop may be opened such that HTF is circulated through a heat exchanger thermally coupled to the exhaust system and through the heat storage device. In this way, a thermal capacity of the heat storage device may be increased.

At 314, method 300 includes determining if a HTF temperature is above a threshold value. For example, the HTF may become too warm when the vehicle is in operation for an extended period of time. If the answer to 314 is NO, method 300 continues to 316. If the answer to 314 is YES, method 300 continues to 318.

At 316, method 300 includes closing a blending loop. As such, the volume of circulating HTF is not adjusted in response to the temperature of the HTF.

At 318, method 300 includes adjusting a variable position valve of the blending loop. As such, a dead volume of HTF is released from the blending loop to reduce the temperature of the circulating HTF. As described above, the temperature of the HTF may be regulated based on a position of the variable position valve. For example, the valve may be fully opened to rapidly cool the HTF. As another example, the valve may be partially opened to moderately cool the HTF.

It will be appreciated that method 300 is provided by way of example, and thus, is not meant to be limiting. Therefore, it is to be understood that method 300 may include additional and/or alternative steps than those illustrated in FIG. 3 without departing from the scope of this disclosure. Further, it will be appreciated that method 300 is not limited to the order illustrated; rather, one or more steps may be rearranged or omitted without departing from the scope of this disclosure. For example, one or more portions of method 300 may occur without starting the engine. As described above, the heat storage device may be activated to discharge without operating the engine.

Various conduits may be referred to as pipes, which can encompass various forms of conduits, passages, connections, etc., and are not limited to any specific cross-sectional geometry, material, length, etc.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
during an engine operation,
reducing a volume of a circulating heat transfer fluid within a heat recovery system;
discharging a heat storage device of the heat recovery system to heat an engine component; and
distributing the circulating heat transfer fluid to a heat exchanger in thermal contact with an engine coolant system, the engine coolant system separate from and different than the heat recovery system.

2. The method of claim 1, further comprising, during the engine operation, recharging the heat storage device by reducing the volume of the circulating heat transfer fluid.

3. The method of claim 1, wherein discharging the heat storage device includes discharging a stored thermal energy of the heat storage device, the stored thermal energy stored from a previous engine operation.

4. The method of claim 3, wherein:
reducing the volume of the circulating heat transfer fluid comprises reducing the volume of the circulating heat transfer fluid while pumping the heat transfer fluid via a pump;
discharging the heat storage device comprises discharging the heat storage device by pumping the heat transfer fluid via the pump; and
distributing the circulating heat transfer fluid to the heat exchanger comprises distributing the circulating heat transfer fluid to the heat exchanger by pumping the heat transfer fluid via the pump,
the heat transfer fluid pumped by the pump during the engine operation.

5. The method of claim 3, wherein the stored thermal energy is transferred to the circulating heat transfer fluid and distributed to an exhaust component upstream from an emissions control device.

6. The method of claim 1, wherein reducing the volume of the circulating heat transfer fluid includes actuating one or more control valves.

7. The method of claim 6, wherein a control valve is closed to inhibit the circulating heat transfer fluid from being distributed to the heat exchanger.

8. The method of claim 1, further comprising distributing the circulating heat transfer fluid to one or more additional heat exchangers each in thermal contact with one or more of a cabin heating system and a transmission system.

9. A heat recovery system for an engine, comprising:
a first heat exchanger in thermal contact with an exhaust system via a coupling to an exhaust passage that flows exhaust gas received from the engine;
a second heat exchanger in thermal contact with an engine coolant system, the engine coolant system separate from and different than the heat recovery system;
a pipe including a heat transfer fluid in fluidic communication with the first and second heat exchangers; and
a heat storage device fluidically coupled to the pipe downstream from the first heat exchanger and upstream from the second heat exchanger.

10. The system of claim 9, further comprising one or more additional heat exchangers each in thermal contact with one or more of a cabin heating system, a transmission system, an exhaust catalyst, and an engine intake air system.

11. The system of claim 9, further comprising one or more control valves and a second pipe fluidically coupled to the first and second heat exchangers, the second pipe bypassing the heat storage device.

12. The system of claim 11, wherein the heat transfer fluid flows through the second pipe to regulate a temperature of the heat transfer fluid.

13. The system of claim 11, further comprising a third pipe fluidically coupled to the heat storage device and the first heat exchanger and bypasses the second heat exchanger.

14. The system of claim 13, wherein the heat transfer fluid flows through the third pipe to recharge the heat storage device.

15. A heat transfer system for an engine, comprising:
a pump driving a circulation of a heat transfer fluid through a pipe system;
an exhaust heat exchanger in thermal contact with an exhaust pipe and fluidically coupled to the pipe system, the exhaust pipe flowing exhaust gas received from the engine;
a plurality of system heat exchangers, different from and in addition to the exhaust heat exchanger, each fluidically coupled to the pipe system and in thermal contact with an engine system separate from the heat transfer system, the plurality of system heat exchangers comprising an engine coolant heat exchanger in thermal contact with an engine coolant system separate from and different than the heat recovery system; and
a heat storage device fluidically coupled to the pipe system between the exhaust heat exchanger and the plurality of system heat exchangers and holding stored heat recovered from a previous engine operation.

16. The heat transfer system of claim 15, wherein the plurality of system heat exchangers are fluidically coupled to the pipe system in parallel.

17. The heat transfer system of claim 15, wherein the plurality of system heat exchangers are fluidically coupled to the pipe system in series.

18. The heat transfer system of claim 15, wherein the stored heat is discharged from the heat storage device at engine start to heat the exhaust pipe at a position upstream from an emissions control device.

19. The heat transfer system of claim 15, wherein the stored heat is discharged from the heat storage device without starting the engine.

20. The heat transfer system of claim 16, further comprising a control valve positioned upstream from each of the plurality of system heat exchangers to regulate a distribution of the heat transfer fluid.

* * * * *